United States Patent Office 2,714,610
Patented Aug. 2, 1955

2,714,610

POLYETHOXY ESTERS OF N-SUBSTITUTED p-AMINOBENZOIC ACIDS

Max Matter, Worb, near Bern, Switzerland, assignor to Ciba Pharmaceutical Products, Inc., Summit, N. J.

No Drawing. Application April 14, 1955,
Serial No. 501,444

Claims priority, application Switzerland February 15, 1950

3 Claims. (Cl. 260—471)

This application is a continuation-in-part of my copending application Serial No. 441,157 filed July 2, 1954, which itself is a continuation-in-part of my copending application Serial No. 210,796 filed February 13, 1951.

Esters of high molecular fatty acids and polyethylene glycols or polyethylene glycol monoalkyl ethers are known; these compounds possess surface-active properties and are used as wetting agents, detergents and emulsifiers.

From experiments made by the applicant it became clear that certain groups of esters from isocyclic carboxylic acids and polyethylene glycols or polyethylene glycol monoethers have excellent pharmacological properties and that they can for instance be used as infiltration anesthetics, spasmolytics, analeptics and bacteriostatics. Such surprising effects are remarkable because, for instance for the preparation of spasmolytics, the simultaneous use of aminoalcohols or other nitrogen containing compounds was thought necessary.

The main object of my said copending applications is concerned with new compounds corresponding to the general formula $$R.O(CH_2.CH_2.O)_nCH_2.CH_2.O.X$$

wherein R means hydrogen or a hydrocarbon radical having at most 6 carbon atoms, $n$ means 4 to 50 inclusive and X means the radical of a carboxylic acid containing at least one isocyclic ring.

The present invention, as is manifest from the appended claims, relates more particularly to compounds of the above formula, wherein R stands for hydrogen or a saturated hydrocarbon radical having at most 6 carbon atoms and $n$ is an integer from 7 to 50, and X stands for a radical of the formula $$-OC-\langle\phantom{x}\rangle-NH-R'$$

R' represents an alkyl radical having from 5 to 7 carbon atoms.

These new esters possess valuable pharmacological properties. More especially they show a local anesthetic effect. They are intended for use as medicaments, e. g. cough remedy, or as intermediates for the preparation of medicines.

Of especial value are the esters of the formula $$R-O.(CH_2.CH_2.O)_n.CH_2.CH_2.O.OC-\langle\phantom{x}\rangle-NHR'$$

wherein R represents hydrogen or advantageously an alkyl radical having 1 to 6 carbon atoms, such as ethyl, propyl, butyl, or hexyl, advantageously methyl, R' stands for an alkyl radical having from 5 to 7 carbon atoms, advantageously amyl and $n$ is an integer from 7 to 14, advantageously 7 to 11. Most important are the esters of the formula $$CH_3.O.(CH_2.CH_2.O)_n.CH_2.CH_2.O.OC-\langle\phantom{x}\rangle-NH-CH_2-CH_2-CH\langle\begin{smallmatrix}CH_3\\CH_3\end{smallmatrix}$$

wherein $n$ is an integer from 7 to 11, for example has a value of 8–10.

The new esters are obtained by esterifying the said carboxylic acids or their functional derivatives with polyethylene glycols or with polyethylene glycol monoethers.

The esterification can be carried out directly or the carboxylic acid can be esterified over the acid chloride or the acid anhydride, for instance according to Schotten-Baumann, or in the presence of pyridine. In some other instances it is more convenient to apply the re-esterification method.

The starting materials used are known or can be prepared by conventional methods. The polyethylene-glycols used have the formula $$R.O.(CH_2.CH_2.O)_nCH_2.CH_2.OH$$

wherein $n$ stands for 4 to 50 inclusive and R stands for hydrogen or a saturated hydrocarbon radical having at most 6 carbon atoms or the phenyl radical.

If for instance R stands for isobutyl the polyethylene glycol derivative is obtained by reacting ethylene glycol monoisobutyl ether with $n$ moles of ethylene oxide in a pressure vessel at a temperature of 160° C. to 170° C. in the presence of a catalytic amount of potassium hydroxide.

The following examples serve to illustrate and explain the present invention without, however, being restrictive. The relationship of parts by weight to parts by volume is that of kilograms to liters.

*Example 1*

270 parts by weight of a mixture of hydnocarpic acid and chaulmoogric acid (obtained by saponification of chaulmoogra oil) of the average molecular weight 270 and a mixture of 360 parts by weight of polyethylene glycol monomethyl ether of the average molecular weight 350 and 15 parts by weight of 65% sulfuric acid are heated together at a temperature of 120° C. while introducing a stream of nitrogen, until a sample is soluble in cold water; this takes 1 to 3 hours. For purification the mixture is vigorously stirred with 600 parts by weight of alumina and 3000 parts by volume of benzene for 1 hour. After filtration and washing of the alumina with benzene the filtrate is evaporated. The remaining residue consists of a mixture of the esters of the hydnocarpic and chaulmoogric acids of polyethylene glycol monomethyl ether in the form of a light yellow oil which is easily soluble in water and in nearly all organic solvents with the exception of ether and of aliphatic hydrocarbons. The new ester shows excellent tuberculostatic properties and is only slightly toxic for warm blooded animals.

The above mentioned mixture of hydnocarpic and chaulmoogric acids was produced from commercial hydnocarpic oil in the following way. By saponification the raw acid mixture was first obtained which was purified after conversion into the methyl ester, by distillation under 0.1 mm. pressure at a temperature of 125° C. to 135° C. By saponification with sodium hydroxide in 80% isopropanol the acid mixture was obtained as a soft white mass.

Esters with similar properties are obtained, if, instead of polyethylene glycol monomethyl ether having the average molecular weight 350, equimolecular quantities of polyethylene glycol monopropyl, isopropyl, butyl or isobutyl ether of the average molecular weight 500 to 2200 are used. If the esterification is applied to a polyethylene glycol monomethyl ether of the average molecular weight 250 an ester is obtained which is not soluble at a temperature of 37° C. but which is easy to emulsify.

Example 2

35 parts by weight of β-benzoylacrylic acid and 70 parts by weight of polyethylene glycol of the average molecular weight 300 and 300 parts by volume of benzene are mixed, treated with 2.5 parts of 60% sulfuric acid and boiled under reflux for 20 hours using a separator for the water which is evaporated with the benzene vapours. Then it is rinsed with benzene in a separating funnel, washed once with a half-saturated sodium chloride solution and three times with saturated sodium hydrogen carbonate ($NaHCO_3$) solution. By evaporation of the benzene solution the raw polyethylene glycol ester of the benzoylacrylic acid is obtained as a light brown oil. It is soluble in five times the amount of water and has disinfecting properties.

The raw material thus obtained can be purified as follows: After dissolution in six times the amount of water it is shaken with twice the quantity of active charcoal for half an hour and then filtered over "Celit 535" in a chromatographic column and washed with water, whereby almost the whole amount of ester will be adsorbed on the active carbon. By eluation with an acetone-water-mixture in the ratio of 1:2 a pure ester is obtained as a light oil which is, in contradistinction to the raw material, clearly soluble in ten to a hundred times the amount of water.

According to the above described method it is possible to esterify also diphenyl-4-carboxylic acid, 4'-chlorodiphenyl ether-4-carboxylic acid and diphenylmethane-4-carboxylic acid with polyethylene glycol monoalkyl ethers.

Example 3

35 parts by weight of β-benzoylacrylic acid, 2.5 parts by weight of p-toluene sulfonic acid and 80 parts by weight of polyethylene glycol monomethyl ether of the average molecular weight 350 are boiled under reflux in 300 parts by volume of benzene for 14 hours using a continuous water-separator.

The benzene solution is thereupon extracted several times with a saturated sodium hydrogen carbonate solution, all aqueous extracts being washed once with benzene. By evaporation of the benzene solutions there is obtained the benzoylacrylic ester of the polyethylene glycol monomethyl ether in the form of a light yellow, water-soluble oil.

The new ester shows in vitro a strong tuberculostatic activity and has an insignificant toxicity for warm blooded animals.

Instead of polyethylene glycol mono-methyl ether one can analogically esterify also polyethylene glycol cyclopentyl ether, polyethylene glycolcyclohexyl ether and polyethylene glycol phenyl ether with β-benzoylacrylic acid, valuable new compounds being thus obtained.

Example 4

8.25 parts by weight of ethyl p-aminobenzoate, 35 parts by weight of commercial polyethylene glycol monomethyl ether of the average molecular weight 350 (dried in a high vacuum at 110° C.) and 4 parts by volume of a 2-normal sodium methylate solution in methanol are heated for 16 hours in vacuo under a pressure of 12 mm. of mercury at a temperature of 100° C. After this time a sample of the light brown oil taken from the reaction vessel is almost quantitatively water-soluble. The whole is poured into 250 parts by volume of water to which are added 5 parts by volume of a 2-n hydrochloric acid. After the addition of one part by volume of a saturated sodium bisulfite solution the mixture is adjusted to a pH 7.5 and shaken with 6 parts by weight of animal charcoal for one hour. The charcoal having been filtered off the filtrate is shaken several times with benzene. All the benzene extracts are washed three times with a saturated sodium hydrogen carbonate solution and evaporated. The excess of polyethylene glycol monomethyl ether is present in the aqueous layers and the p-aminobenzoic acid ester of the polyethylene glycol monomethyl ether is obtained, on evaporation of the benzene solutions, in the form of a light yellow, clear oil. The new ester is soluble in water and can be used as local anesthetic.

The same ester can also be obtained by catalytic hydrogenation of the p-nitrobenzoyl ester of polyethylene glycol monomethyl ether.

Example 5

4.65 parts by weight of cinnamic acid chloride and 8.1 parts by weight of polyethylene glycol monomethyl ether of the average molecular weight 350 (dried at 110° C. in a high vacuum) are heated in 25 parts by volume of absolute pyridine for one hour to 100° C. After cooling it is poured on a mixture of 32 parts by volume of concentrated hydrochloric acid and 160 parts by weight of finely divided ice. Thereupon it is rinsed with 200 parts by volume of chloroform in a separating funnel and the chloroform solution washed each time twice with 2-n hydrochloric acid, a saturated sodium hydrogen carbonate solution and a half-saturated sodium chloride solution. On evaporation of the chloroform solution the raw cinnamic acid ester of polyethylene glycol monomethyl ether remains in the form of a light brown oil. It can be purified by treating it with a small amount of animal charcoal in an aqueous solution.

The new ester can be used as infiltration anesthetic. The benzoic acid ester and the p-methylbenzoic acid ester are obtained in an analogous way, both having local anesthetic properties.

Example 6

23.1 parts by weight of diphenylacetyl chloride and 50 parts by weight of polyethylene glycol monoethyl ether of the average molecular weight 500 are heated with 150 parts by weight of pyridine for one hour to 100° C. After cooling it is poured on a mixture of 300 parts by weight of finely divided ice and 170 parts by weight of concentrated hydrochloric acid. The mixture is then rinsed with 900 parts by volume of benzene in a separating funnel. After the discharge of the aqueous layer the benzene solution is extracted each time twice with 2-n hydrochloric acid, 2-n sodium carbonate solution and with a half-saturated sodium chloride solution; all the aqueous solutions are washed in a second separating funnel with 400 parts by volume of benzene. On evaporation of the benzene solutions there remains a colorless oil which solidifies into a wax-like mass if allowed to stand for a long time, this mass being the diphenylacetic acid ester of polyethylene glycol monoethyl ether which is clearly soluble in water and which has spasmolytic properties. The new substance differs from the usual spasmolytics by the absence of basic groups from the molecule.

Phenyl cyclohexyl acetyl chloride can be esterified in an analogous way with polyethylene glycol monohexyl ether.

Example 7

21 parts by weight of phenyl cyclopentane-1-carboxylic acid chloride having a boiling point of 135° C. (10 mm. Hg), 35 parts by weight of dry technical polyethylene glycol monomethyl ether of the average molecular weight 350 and 150 parts by weight of absolute pyridine are mixed and heated to 110° to 120° C. After 5 minutes it is cooled to room temperature and allowed to stand for 10 hours. A copious white crystalline precipitate is being formed. By a short heating the whole is brought into solution again. The whole reaction mass is then poured on a mixture of 300 parts by weight of finely divided ice and 170 parts by volume of concentrated hydrochloric acid. The whole is rinsed with 600 parts by volume of benzene in a separating funnel, the aqueous layer isolated, the benzene solution extracted each time twice with 2-n-hydrochloric acid and a saturated sodium hydrogen carbonate solution. The aqueous layers are washed once with fresh benzene. The combined benzene solutions which have been dried with sodium sulfate are evaporated. The phenyl cyclopentane-1-carboxylic acid ester of the polyethylene glycol monomethyl ether is left as a colorless oil which is easily soluble in chloroform, toluene, alcohol and acetone. The new ester is soluble in water at temperatures below about 30° C; on heating it is separated from the aqueous solution. As the polyethylene glycol monomethyl ether used for the esterification consists of a mixture of substances with different degrees of polymerization the molecular weight of the new ester may also vary within a certain range. The higher molecular portions can be separated from the low molecular portions by physical methods. For this purpose one may proceed as follows:

3.82 grams of the ester produced according to this example are dissolved in 100 cc. of water and extracted three times with 100 cc. of ether. The ethereal solutions are washed three times with 30 cc. of water. The ethereal solutions dried over sodium sulfate and evaporated, whereupon 3.10 grams of ester remain which can partly be precipitated from an aqueous solution by heating it to over 30° C. From the aqueous solutions 0.70 gram of ester can be isolated by extraction with chloroform; the ester is then precipitated from an aqueous solution only on heating it up to a temperature of over 60° C.; this fraction contains the higher molecular portions.

The new ester is a valuable spasmolytic.

*Example 8*

2.5 parts of para-hexylamino-benzoic acid ethyl ester are placed in a closed reaction vessel with 8 parts of octa-ethylene glycol monomethyl ether, the reaction vessel being provided with a regulatable inlet for solvent and with a connection for distilling in vacuo. In order to dry the mixture completely it is heated for one hour at 100–105° C. and absolute xylene is introduced under the surface of the mixture at a reduced pressure of 12 mm. of mercury. In this manner a continuous stream of xylene vapor passes through the whole apparatus and carries with it the last traces of moisture and other volatile impurities. The xylene is condensed in a condenser. The mixture is cooled to 20–30° C. and 0.06 part of sodium methylate dissolved in 0.6 part of methanol is added. Xylene is then passed through the apparatus again under reduced pressure at 100–105° C., whereby all of the methanol and the ethanol formed during the re-esterification are evaporated. The re-esterification is allowed to proceed under these conditions until a test portion of the reaction mass dissolves clearly in cold water, which is the case after about 2–3 hours. There is obtained in almost quantitative yield the ester of para-hexylamino-benzoic acid with octaethylene glycol monomethyl ether of the formula

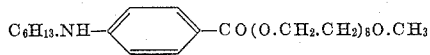

which still contains an excess of octaethylene glycol monomethyl ether. For the purpose of purification the product is dissolved in benzene and the benzene solution is washed several times with a solution of sodium carbonate of 5 per cent strength. It is of advantage to extract all the aqueous washing solutions with fresh benzene. In this distribution between benzene and sodium carbonate solution the new ester remains in the benzene, and the excess of polyethylene glycol monomethyl ether and a small amount of brown impurities are taken up by the dilute sodium carbonate solution. By evaporating the dried and filtered benzene solution the new ester is obtained in the form of a colorless to quite pale yellow oil, which is easily soluble in most organic solvents, with the exception of aliphatic hydrocarbons. The new ester precipitates from an aqueous solution thereof of 10 per cent strength when heated at about 33° C. On cooling the ester easily re-dissolves.

The para-hexylamino-benzoic acid ethyl ester used as starting material may be prepared as follows:

8.3 parts of n-hexylbromide are stirred with 33 parts of para-amino-benzoic acid ethyl ester and a small quantity of copper powder for 12 hours at 130–140° C. and after cooling the mixture it is digested with 300 parts by volume of ether. After filtering the ethereal solution to remove insoluble matter, it is agitated several times with N-hydrochloric acid and evaporated. The residue crystallizes on cooling. There is obtained from the residue by re-crystallization from a small quantity of ethanol and from a mixture of benzine and benzene (1:1) the colorless ester in a pure form melting at 89° C.

The octaethylene glycol monomethyl ether used as starting material may be prepared as follows:

35 parts of sodium are dissolved at 90–100° C. in portions in 500 parts by volume of triethylene glycol. At a bath temperature of 100–110° C. there are introduced dropwise in the course of 7 hours, while stirring energetically, 522 parts of pentaethylene glycol monomethyl ether-benzene sulfonate, and the whole is allowed to stand without stirring for 20 hours in an oil bath at 100–110° C. in an atmosphere of nitrogen.

After cooling the mixture, 300 parts by volume of water are added, and the whole is thoroughly extracted by agitation with 1 liter of chloroform. The aqueous layer is again extracted four times with 250 parts by volume of chloroform on each occasion. The chloroform extracts are extracted in succession twice with 150 parts by volume of water on each occasion. By drying and evaporating these chloroform extracts there are obtained 499 parts of a crude product, which is then well mixed with 100 parts by volume of ammonia of 25 per cent strength, and the whole is allowed to stand overnight and then heated for 4 hours at 100° C. The mixture is then evaporated under reduced pressure produced by a water jet pump and there are obtained 495.5 parts of a residue. The latter is diluted with 250 parts by volume of water and allowed to run through a column of a mixed bed of 100 parts by volume each of Amberlite JR 120 and JRA 410. The column is washed with 500 parts by volume of water and the elutriate is evaporated at 100° C. under 10 mm. pressure. There are obtained 487 parts of a residue.

484 parts of the crude product so obtained yield, upon distillation under a high vacuum, 10 parts of forerunnings, 70 parts of a distillation residue which solidifies, and 400 parts of octaethylene glycol monomethyl ether boiling at 165° C. (210° C.) under 0.01 mm. pressure.

The pentaethylene glycol monomethyl ether benzene sulfonate used above may be prepared as follows:

530 parts of the benzene sulfonic acid ester of diethylene glycol monomethyl ether are run in the course of 4 hours at 100° C., and while stirring, into a solution of 50 parts of sodium in 800 parts by volume of triethylene glycol, and the reaction mixture is maintained at 100° C. overnight. After cooling the mixture, there are added 500 parts by volume of water and 100 parts by volume of chloroform and the whole is well agitated. The chloroform layer is again extracted twice with 250 parts by volume of water on each occasion, and then evaporated. There remain behind 220 parts of crude pentaethylene glycol monomethyl ether. By extracting 5 times the three water layers each with 500 parts by volume of chloroform, there are obtained a further 250 parts of crude pentaethylene glycol methyl ether. From the crude product there are obtained by distillation at 110° C. under a high vacuum of 0.01 mm. 400 parts of the pure ether in the form of a colorless oil.

50 parts of pentaethylene glycol monomethyl ether are dissolved in 100 parts by volume of benzene, and 35 parts by volume of benzene sulfochloride are added dropwise in the course of ½ hour, while stirring and cooling, at 20–30° C. At the same time 15 parts of pulverized sodium hydroxide are added in equal portions. The whole is further stirred for 2½ hours, and then allowed to stand overnight without stirring. The mixture is then filtered with suction to remove precipitated salts, and the filtrate is agitated with 20 parts by volume of an aqueous solution of ammonia of 25 per cent strength for 4 hours. Any benzene sulfochloride which is still present is converted in this manner into the alkali-soluble sulfonamide. The whole is mixed with 50 parts by volume of caustic soda solution of 10 per cent strength and agitated well. The aqueous layer is extracted once more with 150 parts by volume of benzene and the two benzene extracts are washed in succession with 50 parts by volume of caustic soda solution of 10 per cent strength and 50 parts by volume of water. By evaporating the dried benzene solution there are obtained 70 parts of the solvent-free benzene sulfonic acid ester of pentaethylene glycol monomethyl ether in the form of an almost colorless oil.

*Example 9*

2.63 parts of para-heptylamino-benzoic acid ethyl ester are reacted with 8 parts of octaethylene glycol monomethyl ether as described in Example 8. In this manner there is obtained in almost quantitative yield the ester of para-heptylaminobenzoic acid with octaethylene glycol monomethyl ether of the formula

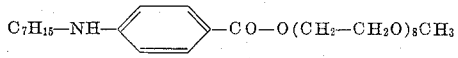

which still contains an excess of octaethylene glycol monomethyl ether. The product is purified in the manner described in Example 8. In this manner there is obtained the new ester in the form of a colorless to quite pale yellow oil, which is easily soluble in most organic solvents, with the exception of aliphatic hydrocarbons. The new ester is precipitated from an aqueous solution of 10 per cent strength by heating it at about 32° C., but it easily redissolves on cooling.

The para-heptylamino-benzoic acid ethyl ester used as starting material may be prepared as follows:

18 parts of n-heptyl bromide and 50 parts of para-aminobenzoic acid ethyl ester are stirred in the presence of a small amount of copper powder in a flask provided with an ascending tube for 12 hours at 120–125° C., the mixture is then taken up in 250 parts by volume of ether, and the solution is filtered to remove insoluble matter and poured into a separating funnel. By repeated agitation with n-hydrochloric acid unreacted para-aminobenzoic acid ethyl ester is removed, and by evaporating the ethereal solution 26 parts of crude para-hexylaminobenzoic acid ethyl ester are obtained. The product may be purified by recrystallization from a mixture of ether and petroleum ether or from benzine. The pure ester boils at 122–124° C. under 12 mm. pressure of mercury and melts at 77° C.

The preparation of the octaethylene glycol monomethyl ether used as starting material is described in Example 8. By using decaethylene glycol monomethyl ether, instead of octaethylene glycol monomethyl ether, for the re-esterification of para-heptylamino benzoic acid ethyl ester there is obtained an ester which is still soluble in water at 40° C. and has similar properties.

*Example 10*

2.35 parts of para-isoamylamino-benzoic acid ethyl ester are reacted by the method described in Example 8 with 9 parts of polyethylene glycol monomethyl ether boiling at 200–220° C. under 0.01 mm. pressure. There is obtained in almost quantitative yield the ester of a polyethylene glycol monomethyl ether with para-isoamyl-aminobenzoic acid ethyl ester of the formula

in which $n$ has the average value of 9–11, and which still contains an excess of polyethylene glycol monomethyl ether. Purification is carried out as described in Example 8. By evaporating the dried and filtered benzene solution the new ester is obtained in the form of a colorless to very slightly yellow oil, which is easily soluble in most organic solvents with the exception of aliphatic hydrocarbons. The new ester precipitates from an aqueous solution of 10 per cent strength when heated to about 43° C., but easily redissolves upon cooling.

The same ester can also be prepared as follows:

2.07 parts of para-isoamylaminobenzoic acid, 1.85 parts of benzene sulfonic acid (containing 1 mol of water of crystallization) and 7 parts of polyethylene glycol monomethyl ether boiling at 200–220° C. under 0.01 mm. pressure are heated for 3 hours at 140–150° C. while introducing a dry current of nitrogen. At the end of this period the esterification accompanied by the splitting off of water is practically finished. For the purpose of purification the reaction mass is distributed several times between benzene and a 2 N-solution of sodium carbonate, the dried benzene solution is evaporated, and there is obtained as a residue the new ester in a yield of 5.9 parts.

By the usual methods the new esters obtained according to the invention can be made up into pharmaceutical preparations for entereal or parenteral, especially oral administration. Such preparations contain the said esters in admixture with a suitable pharmaceutical organic or inorganic carrier material for enteral or parenteral, especially oral administration. For the production of these preparations such substances are concerned as do not react with the new compound. The pharmaceutical preparations can be made up, for example, into the form of syrups or in liquid form as solutions. If desired, they may be sterilized and/or may contain auxiliary substances such as preservative, stabilizing, wetting or emulsifying agents, or salts for the control of the osmotic pressure or buffer substances. They may also contain other therapeutically valuable substances or flavoring agents.

In the mentioned preparations the content of the esters may amount, for example, to 0.5 per cent by weight.

What is claimed is:

1. The new esters of the formula:

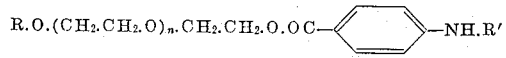

wherein $n$ means an integer from 7 to 50 inclusive, R stands for a member selected from the group consisting of hydrogen and saturated hydrocarbon radicals having at most 6 carbon atoms and R' represents a member of the group consisting of alkyl radicals having from 5 to 7 carbon atoms.

2. The new esters of the formula:

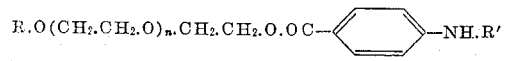

wherein $n$ is an integer from 7–11, and R stands for an alkyl radical having at most 6 carbon atoms and R' for an alkyl radical having from 5 to 7 carbon atoms.

3. The new ester of the formula

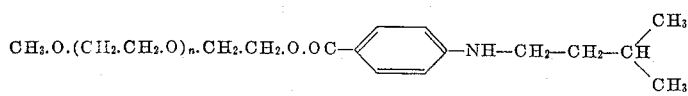

wherein $n$ has an average value of 8–10.

No references cited.